US008672119B2

(12) United States Patent
Anstett

(10) Patent No.: US 8,672,119 B2
(45) Date of Patent: Mar. 18, 2014

(54) SYSTEM FOR CONVEYING A PART

(75) Inventor: Michael David Anstett, Waterloo (CA)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 67 days.

(21) Appl. No.: 13/248,893

(22) Filed: Sep. 29, 2011

(65) Prior Publication Data

US 2013/0081551 A1 Apr. 4, 2013

(51) Int. Cl.
*B65G 17/00* (2006.01)

(52) U.S. Cl.
USPC .................. 198/831; 198/800; 198/475.1

(58) Field of Classification Search
USPC .................. 198/817, 831, 465.2, 475.1, 800; 104/168
See application file for complete search history.

(56) References Cited

U.S. PATENT DOCUMENTS

| 3,397,651 | A | 8/1968 | Biedess |
| 4,029,199 | A | 6/1977 | Reens |
| 4,715,287 | A | 12/1987 | Wentworth et al. |
| 4,774,757 | A | 10/1988 | Sakamoto et al. |
| 4,860,878 | A | 8/1989 | Mraz et al. |
| 5,012,917 | A | 5/1991 | Gilbert et al. |
| 5,377,813 | A | 1/1995 | Markin et al. |
| 5,715,931 | A | 2/1998 | Langenbeck |
| 5,865,300 | A | 2/1999 | Newsome |
| 6,244,425 | B1 | 6/2001 | Volker et al. |
| 6,394,260 | B1 * | 5/2002 | Barth et al. .................... 198/799 |
| 6,494,142 | B2 * | 12/2002 | Masugaki et al. ............ 104/168 |
| 6,554,557 | B1 | 4/2003 | Takehara et al. |
| 6,669,009 | B2 * | 12/2003 | Ledingham et al. ....... 198/836.3 |
| 7,461,733 | B2 | 12/2008 | Dohi |
| 7,487,869 | B2 * | 2/2009 | Swoboda ...................... 198/780 |
| 7,708,134 | B2 | 5/2010 | Doan |
| 7,762,384 | B1 * | 7/2010 | Greene ...................... 198/475.1 |
| 7,810,629 | B2 * | 10/2010 | Kronseder et al. ......... 198/347.1 |

FOREIGN PATENT DOCUMENTS

JP 11049321 A 2/1999

* cited by examiner

*Primary Examiner* — Ramya Burgess
*Assistant Examiner* — Thomas Randazzo
(74) *Attorney, Agent, or Firm* — Gifford, Krass, Sprinkle, Anderson & Citkowski, P.C.

(57) ABSTRACT

A system for providing stability to a carriage along a curved portion of a rail. The system includes a support rail having a bend. The bend includes a support surface. The carriage is configured to engage the support surface so as to stabilize the carriage as the carriage is moved through the curved portion of the rail.

12 Claims, 4 Drawing Sheets

SYSTEM FOR CONVEYING A PART

FIELD OF THE INVENTION

The present invention relates to a system having a carriage configured to carry a part. The carriage is operable to move a part along a carriage rail having a curved portion. The system includes a rail support spaced apart the carriage rail. The rail support includes a bend extending along a portion of the length of the curved portion of the carriage rail so as to provide support for the carriage as the carriage moves along the curved portion of the carriage rail.

BACKGROUND OF THE INVENTION

Systems for carrying a part along a manufacturing line are currently known and used, and is generally shown in FIG. 1. Such systems may include a rail having a carriage that is slidably mounted to the rail. In some instances, the rail includes a curved portion to facilitate the movement of a part from one machine to another. Curved portions may also maximize the floor space of the manufacturing plant.

The carriage may carry a relatively wide part, meaning that the edges of the part extend substantially beyond the rail. Thus in instances where the carriage is traveling along a curved portion of the rail, the inertia of the part carries the part forward yet the carriage is being turned thus causing instability along the carriage.

Some systems include links mechanically coupled to the rail. The links are pivotably coupled to each other and are driven along the rail by a motor. These links may have kingpin and bushings which mechanically and pivotally couple the links to each other. The carriage turns and may torque the kingpin-bushing as the carriage manipulates a curved portion. This causes premature wear and tear of the bushing and kingpins thus destabilizing the stability of the rail system. Accordingly, it remains desirable to have a system configured to stabilize the carriage along a curved portion of the rail system so as to prevent premature wear and tear of the bushing kingpin couplings.

SUMMARY OF THE INVENTION

The present invention provides a system for stabilizing a carriage along a curved portion of a rail, referenced herein as a "carriage rail." The system includes a carriage configured to carry a part. The carriage rail is generally an elongated member and includes a curved portion.

The carriage is operable to carry and move the part along the carriage rail. A support rail is spaced apart the carriage rail. The support rail has a bend. The bend extends along a portion of the length of the curved portion of the carriage rail.

The carriage rail may further include a plurality of links which are pivotally coupled to each other via the use of a bushing kingpin assembly. A drive is operable to move the links along the carriage rail. The carriage is mechanically coupled to at least one of the plurality of links, so as to move along the carriage rail.

The bend includes a support surface. The support surface is configured to engage a portion of the carriage when the carriage travels along the curved portion of the carriage rail. More specifically, the support surface is configured to keep the carriage from tipping and stabilize the carriage along a generally horizontal plane so as to prevent the carriage from applying a torque onto the carriage rail.

The support surface of the support rail is disposed along a first horizontal plane. The support rail includes a base that is mounted to the carriage rail so as to retain the support rail in a fixed position relative to the carriage rail. The curved portion of the carriage rail extends from a first axis. More specifically, the curved portion extends the length of a first radius about a first axis. The support rail has a bend that extends the length of a second radius about the first axis. The second radius is longer than the first radius.

The carriage is adapted to be mounted onto the carriage rail. The carriage has an arm extending laterally from the body of the carriage. The arm has a contact surface configured to engage the bend of the support rail. The support rail is spaced apart from the carriage rail and may be disposed on the outsider of the curved portion of the carriage rail. Thus as the carriage is moved along the curved portion, the outer portion of the carriage tends to tip due to the inertia. If the carriage tips, the contact surface of the carriage engages the bend of the support rail so as to support the carriage and prevent the carriage from tipping, thus eliminating torque on the carriage rail upon which the carriage is mounted.

The support rail may be disposed along a first horizontal plane and the carriage rail is disposed along a second horizontal plane. The first horizontal plane may be disposed above the second horizontal plane. Preferably, the arm includes a roller configured to engage the bend. Thus the roller provides for a smooth sliding motion along the bend so as to facilitate the movement of the carriage along the carriage rail.

The support rail may be modular so as to accommodate a plurality of curves along a rail system. The support rail may include a base that is mounted to the carriage rail. The base includes a first elongated base member and a stand disposed on one end of the first elongated base member. The stand extends upwardly from the first elongated base member so as to be generally orthogonal to the first elongated base member. The other end of the first elongated base member is mounted to the carriage rail so as to form an L-shaped support.

The carriage may include a plurality of carriage arms. Each of the plurality of carriage arms includes a carriage arm support surface disposed on the free ends of each arm. Each of the carriage arm support surfaces is adapted to engage a portion of the part so as to suspend the part above the carriage.

The system may further include a sensor operable to count the number of times one of the plurality of links has passed by the sensor. A controller and an indicator may also be provided. The controller is in electrical communication with the sensor and is operable to actuate the indicator when the sensor detects that one of the plurality of links has passed by the sensor a predetermined number of times. The predetermined number of times may be based upon conventional wear and tear of the bushing and kingpin assembly.

Accordingly, the system provides stability to the carriage as the carriage is moved along a curved portion of a carriage rail. The system is further operable to provide notice to the user when an inspection of the system is needed based upon the use of the system.

DETAILED DESCRIPTION OF THE INVENTION

Figure 1:
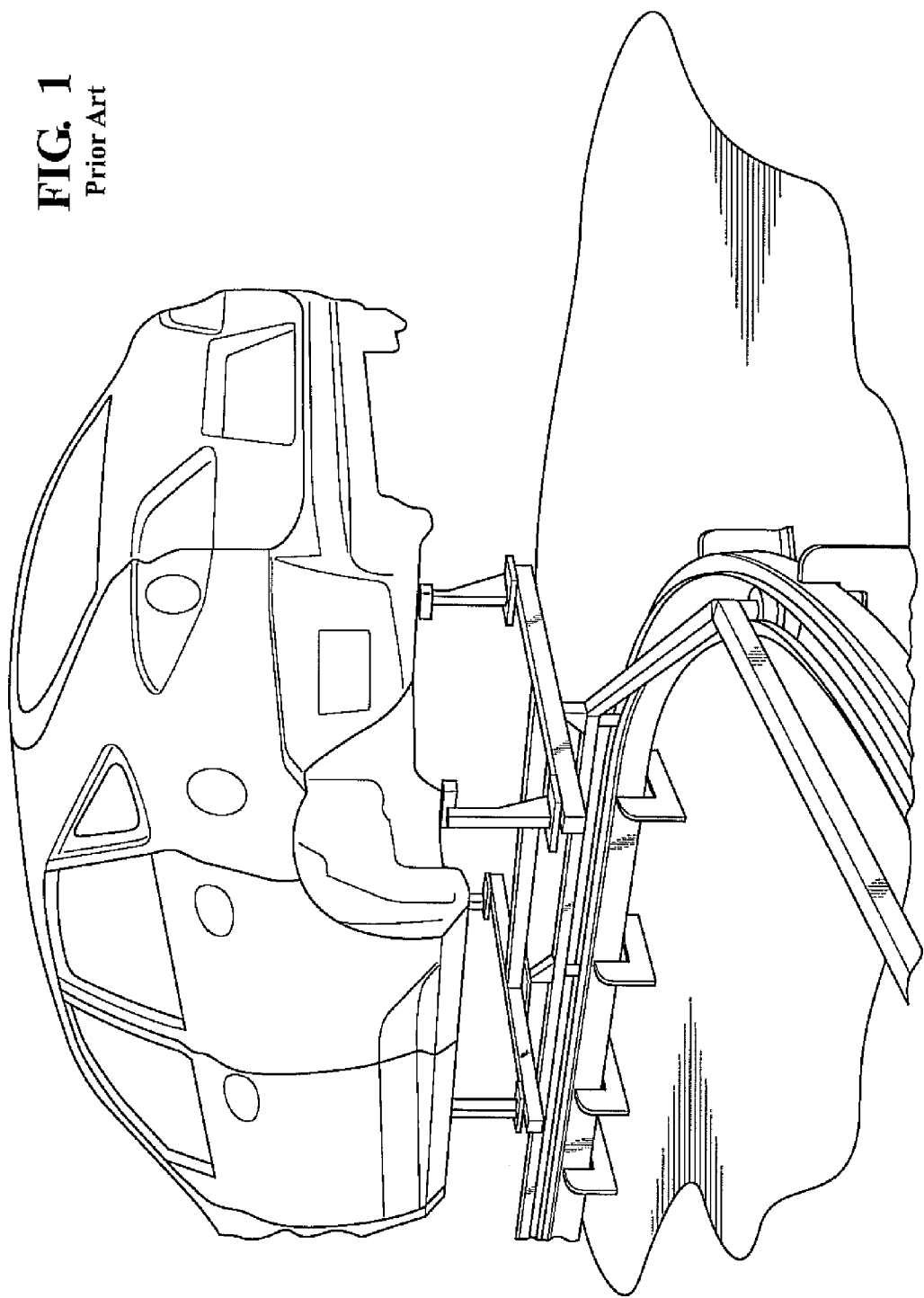
FIG. 1 is a perspective view of a system of the prior art.
Figure 2:
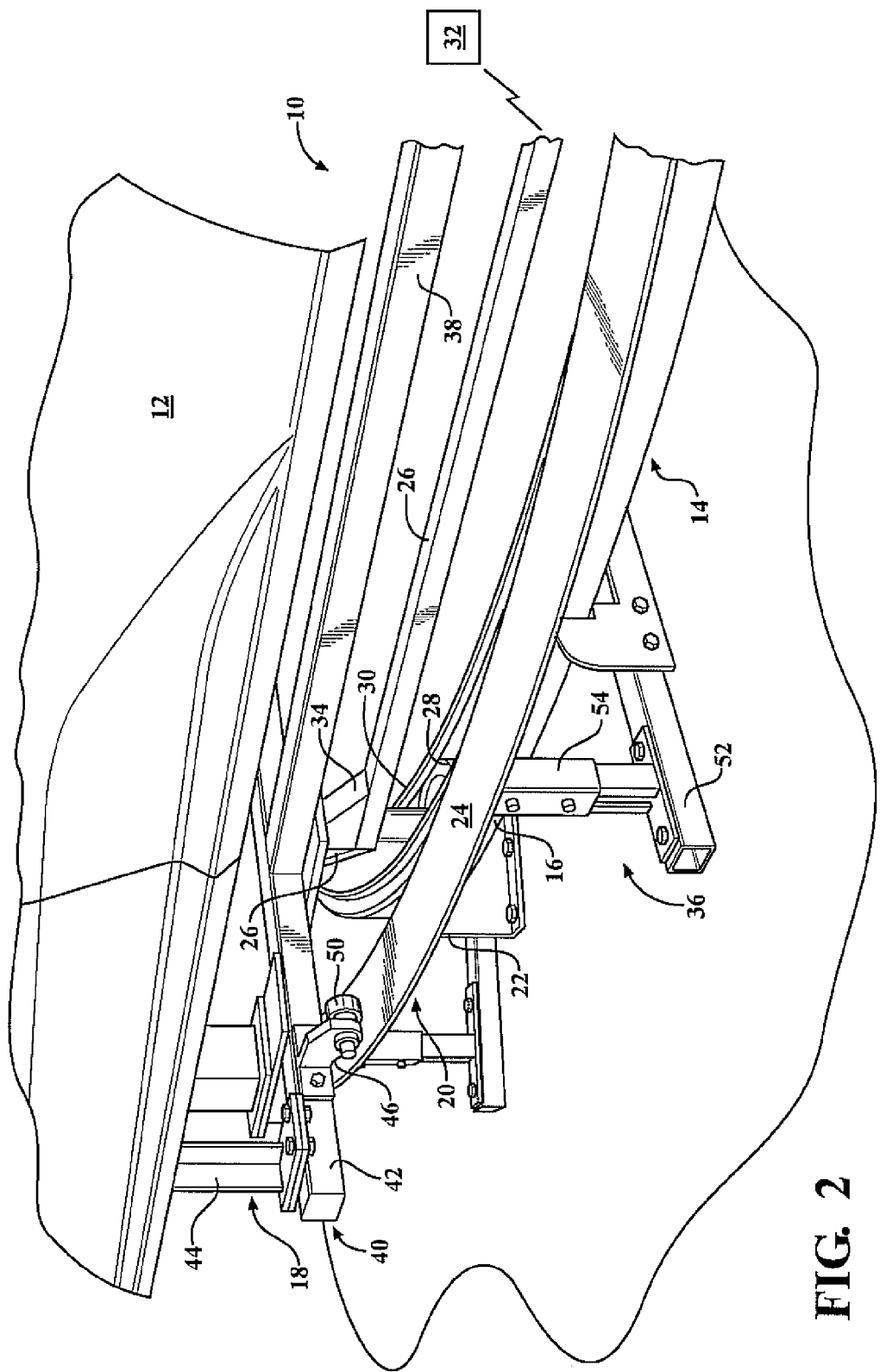
FIG. 2 is an illustrative view of an embodiment of a system of the present invention.

Referring to FIG. 2, a system 10 for carrying a part 12 is provided. The system 10 includes a carriage rail 14. The carriage rail 14 is a generally elongated member and includes a curved portion 16. The carriage rail 14 may be formed of a durable and rigid material such as steel. The carriage rail 14 may be disposed on the floor of a manufacturing plant and extend between various tooling.

The system 10 may further include a carriage 18. The carriage 18 is configured to carry a predetermined part 12. The carriage 18 is mechanically coupled to the carriage rail 14 and movable along the carriage rail 14 so as to deliver the part 12 to various tooling for manufacturing. The carriage 18 may be formed of a durable and rigid material such as steel.

The system 10 includes a support rail 20 spaced apart the carriage rail 14. The support rail 20 includes a bend 22. The bend 22 extends along a portion of the length of the curved portion 16 of the carriage rail 14. The bend 22 includes a first support surface 24 configured to engage a portion of the carriage 18 when the carriage 18 travels along the curved portion 16 of the carriage rail 14. Accordingly, the system 10 provides stability to the carriage 18 so as to prevent the carriage 18 from tipping as the carriage 18 is moved along the curved portion 16 of the carriage rail 14.

Figure 3:
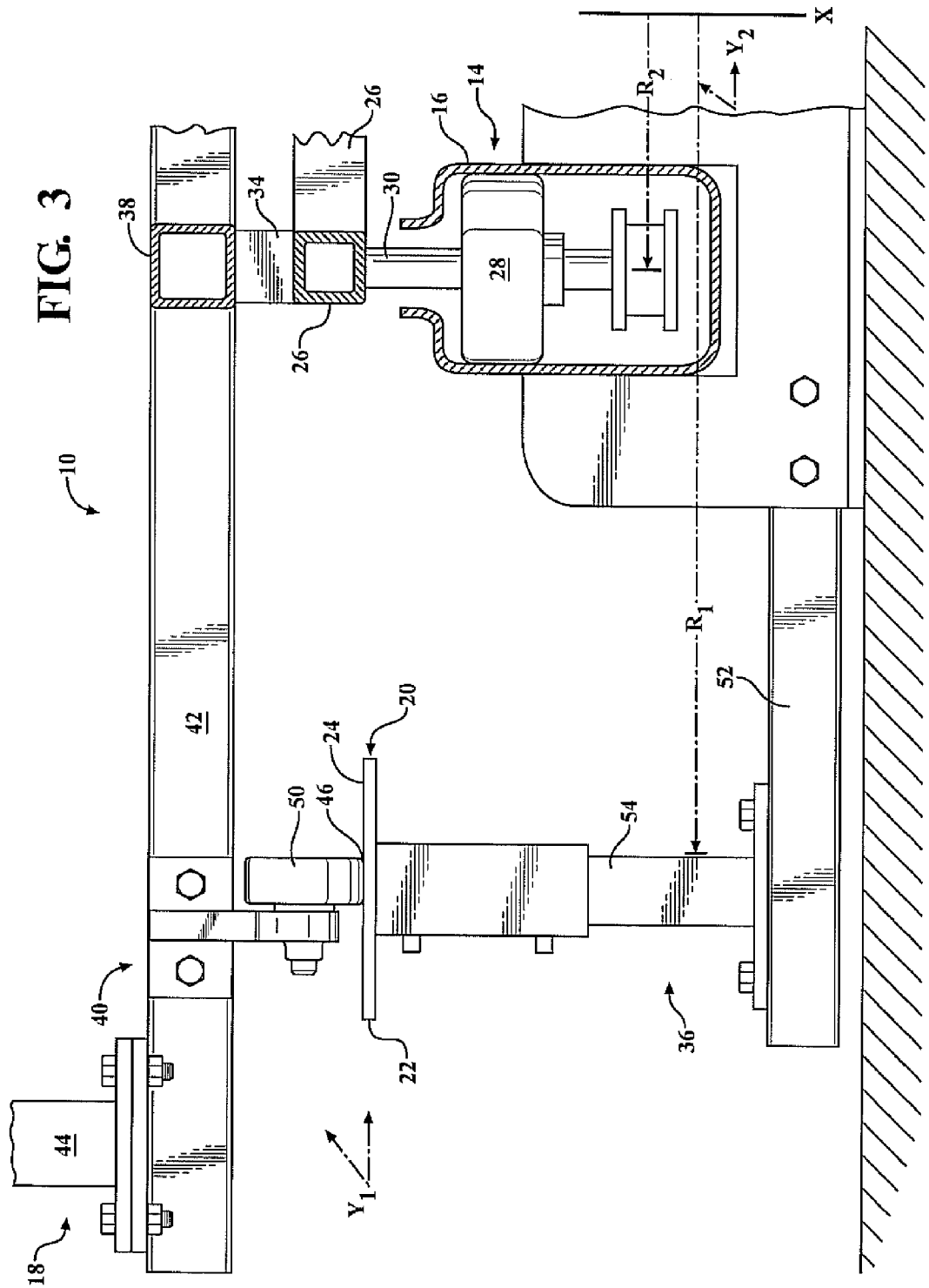
FIG. 3 is an isolated view of FIG. 2 showing the carriage engaging the support rail along a curved portion of the carriage rail.
Figure 4:
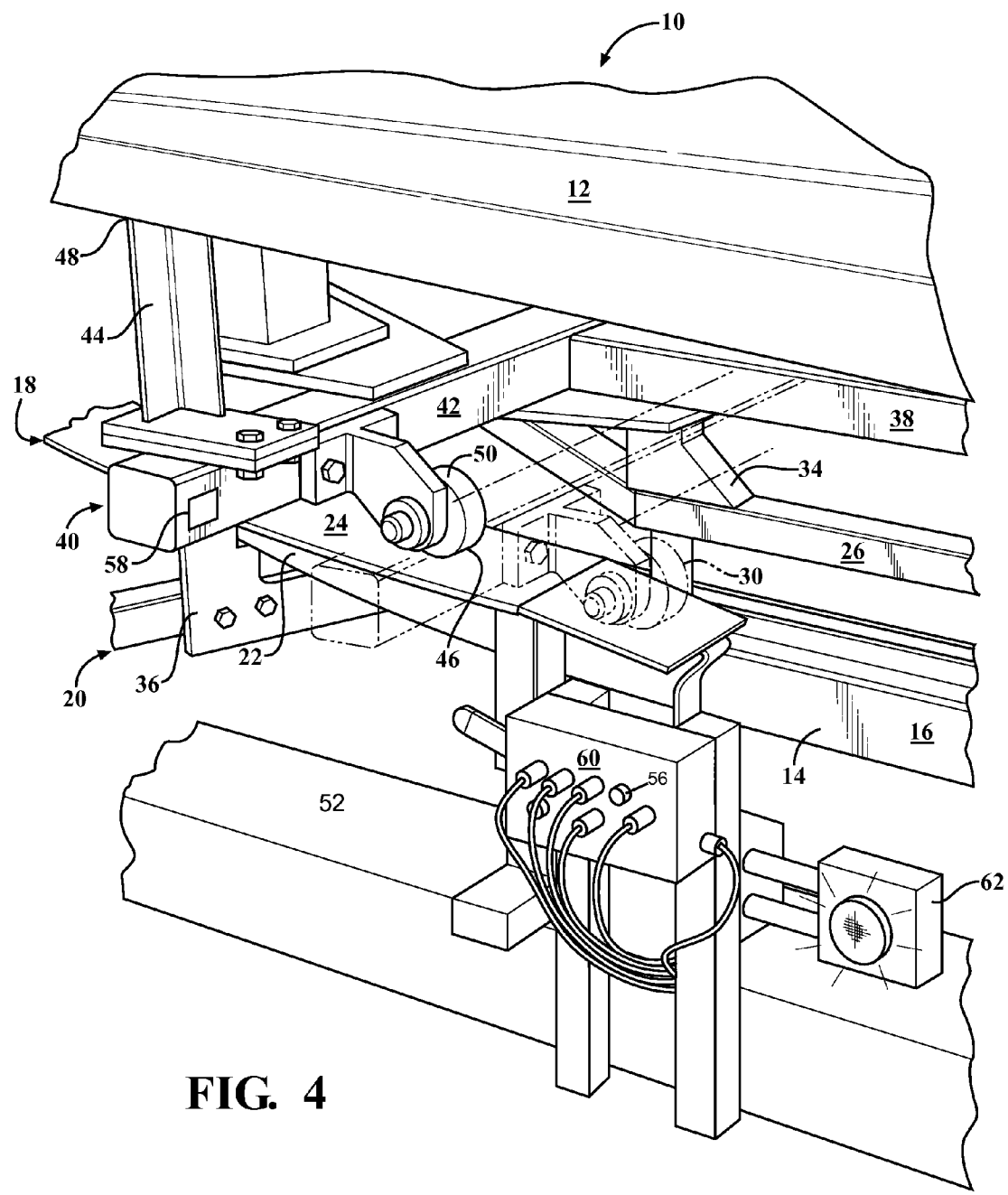
FIG. 4 is an isolated view showing the sensor.

With reference again to FIG. 2 and now to FIG. 3, a first preferred embodiment of the system 10 is provided. The system 10 further includes a plurality of links 26. Each of the plurality of links 26 has a bushing 28 on one end and a pin 30 on the other. The end of each of the links 26 is coupled together about one end of a pin 30 so as to allow the links 26 to pivot relative to each other. The bushing 28 is rotatably disposed on the opposite end of the pin 30. The links 26 are mechanically coupled to the carriage rail 14. The links 26 may be driven along the carriage rail 18 by a drive 32 such as an electric motor.

The carriage 18 includes a pair of carriage mounts 34. Each of the pair of carriage mounts 34 is fixedly disposed on opposite ends of the carriage 18. As shown in the figures, the carriage mounts 34 are disposed beneath the carriage 18 and mounted onto a link 26. One of the pair of carriage mounts 34 is mounted to one end of the link 26 generally disposed above one of the pins 30. The other of the pair of carriage mounts 34 is disposed on the link 26 generally above an adjacent pin 30.

The support rail 20 further includes a base 36 mounted to the carriage rail 14. The curved portion 16 of the carriage rail 14 extends a length of a first radius (R1) from a first axis indicated by reference letter X. The support rail 20 is spaced apart the carriage rail 14. The bend 22 of the support rail 20 extends a length of a second radius (R2) from the first axis X. The second radius is shorter than the first radius so as to support the carriage 18 along the outer edges of curved portion 16 of the carriage rail 14.

The carriage 18 is adapted to be mounted onto the carriage rail 14. The carriage 18 has an elongated support member 38 extending the length of the carriage 18. The carriage includes a plurality of arms 40. Each arm 40 extends laterally from the elongated support member 38. The arm 40 has a first portion 42 and a second portion 44. The first portion 42 extends outward from the elongated support member 38. The first portion 42 of the arm 40 includes a contact surface 46 configured to engage the first support surface 24 of bend 22 in the support rail 20.

The second portion 44 of the arm 40 projects generally upwardly from a distal end of the first portion 42 of the arm 40. The free end of the second portion 44 may include grippers 48 configured to engage a portion of the part 12. The free end of the second portion 44 of each of the arms 40 is displaced from the elongated support member 38 of the carriage 18 so as to suspend the part 12 above the carriage rail 14. It should be appreciated that some second portions 44 of the arms 40 may be longer than others depending on the part 12 which the carriage 18 is intended to support.

The support rail 20 is disposed along a first horizontal plane, indicated by reference Y1 in FIG. 3. The carriage rail 14 is disposed along a second horizontal plane, indicated by reference Y2 in FIG. 3. The arm 40 of the carriage 18 may include a roller 50 configured to engage the bend 22. The roller 50 may include a biasing member operable to urge the roller 50 downwardly so as to provide the carriage 18 with a predetermined amount of tolerance, facilitating the engagement of the arm 40 onto the first support surface 24 of the bend 22 in the support rail 20.

The support rail 20 may be modular. The system 10 may include a plurality of modular support rails 20 each supporting a respective curved portion 16 along the carriage rail 14. The base 36 may be adaptively mounted to the curved portion 16 of the carriage rail 14. The base 36 includes an elongated base member 52 and a stand 54. The elongated base member 52 may be mounted onto a bracket supporting the carriage rail 14. The elongated base member 52 extends outwardly from the outer edge of the curved portion 16 of the carriage rail 14.

The stand 54 is disposed on a free end of the elongated base member 52 and extends generally upwardly therefrom. The upper end of the stand 54 is mounted to the support rail 20. The stand 54 supports the support rail 20 with respect to the curved portion 16 of the carriage rail 14.

The system 10 may further include a sensor 56 operable to count the number of times one of the plurality of links 26 or a carriage 18 has passed by the sensor 56. The system may include a tag 58. The tag 58 may be mounted on a link 26 or a carriage 18. The tag 58 may be include a bar code. The sensor 56 may be an IR sensor 56 operable to detect the tag 58. The sensor 56 is operable to count how many times the tag 58 has passed by the sensor 56.

The system 10 may further include a controller 60 and an indicator 62. The controller 60 is in electrical communication with the sensor 56 and the indicator 62. The controller 60 is operable to actuate the indicator 62 so as to alert the user when the link 26 has passed by the sensor 56 a predetermined number of times thus providing notice to the user that it may be time to inspect the system 10 for wear and tear.

In operation, a part 12 such as a vehicle body is mounted onto the carriage 18. Specifically, the free end of the second portion 44 of the arms 40 suspends the part 12 above the elongated support member 38 of the carriage 18. The sides of the body of the part 12 extend outwardly from the carriage rail.

The carriage mount is fixedly disposed on one of the respective links 26. The drive 32 is actuated so as to move the part 12 along the carriage rail 14 between various tooling machines. As the carriage 18 travels along the curved portion 16 of the rail, the inertia of the part 12 carries the part 12 forward. This may cause the carriage 18 to teeter with respect to the link 26. When the carriage 18 teeters, the first portion 42 of the arm 40 engages the support surface of the support rail 20, stabilizing the carriage 18 so as to prevent torque from being applied to the links 26 with respect to the pins 30.

One of the links 26 or carriage 18 may be equipped with a tag 58. The sensor counts how many times the tag 58 has passed by. It should be appreciated that the link 26 or carriage 18 travels in one direction along the rail. Thus, a user may be able to get an accurate indication of how many times the carriage 18 or rail has passed by the sensor. This information may be used to determine how much wear and use the system 10 has been subjected to.

The count is provided to the controller 60, and the controller 60 is operable to actuate the indicator 62 when the tag 58 has passed by the sensor a predetermined number of times. The indicator 62 may be a red light, or an audio or text signal indicating that the user should inspect the system 10 for wear.

Accordingly, the system 10 is operable to stabilize the part 12 as it passes along a curved portion 16 of the carriage rail 14 so as to prevent torque from being applied to the links 26 and pins 30. The system 10 is further operable to provide the user with notice as to the amount of wear and use the system 10 has been subjected to.

In view of the teaching presented herein, it is to be understood that numerous modifications and variations of the present invention will be readily apparent to those of skill in the art. Likewise, the foregoing is illustrative of specific embodiments of the invention but is not meant to be a limitation upon the practice thereof. It is the following claims, including all equivalents, which define the scope of the invention.

I claim:

1. A system having a carriage configured to carry a part, the carriage operable to move the part along a carriage rail, wherein the carriage rail includes a curved portion, the system comprising:
    an elongated support member extending the length of the carriage, at least one arm extending laterally from the elongated support member, each of the at least one arm having a contact surface disposed on a second horizontal plane;
    a support rail spaced apart the carriage rail, the support rail having a bend, the bend extending along a portion of the length of the curved portion of the carriage rail, the bend having a support surface disposed on a first horizontal plane, the first horizontal plane is below the second horizontal plane of the contact surface, the contact surface of the elongated support member configured to engage the support surface of the carriage in the event the carriage tips when the carriage travels along the curved portion of the carriage rail.

2. The system as set forth in claim 1, wherein the support rail includes a base, the base mounted to the carriage rail.

3. The system as set forth in claim 1, wherein the bend extends along an entire length of the curved portion of the carriage rail.

4. A system for transporting a part, the system comprising:
    a carriage rail, having a curved portion, the curved portion extending from a first radius about a first axis;
    a carriage adapted to be mounted onto the carriage rail, the carriage having a base mounted to the carriage rail, the base including an elongated support member, an arm extending laterally from the carriage, the arm having a contact surface disposed on a second horizontal plane;
    a support rail spaced apart the carriage rail, the support rail having a bend extending along the curved portion of the carriage rail, the bend extending from a second radius about the first axis, the second radius longer than the first radius, the bend having a support surface disposed on a first horizontal plane, the first horizontal plane is below the second horizontal plane of the contact surface.

5. The system as set forth in claim 4, wherein the arm includes a roller, the roller configured to engage the bend.

6. The system as set forth in claim 4, further including a plurality of links, each of the plurality of links pivotably coupled to a respective one of a plurality of pins, each of the plurality of pins having a bushing, the bushing slidably mounted to the carriage rail.

7. The system as set forth in claim 6, wherein the carriage includes a pair of carriage mounts, each of the pair of carriage mounts fixedly disposed on opposite ends of the carriage, the pair of carriage mounts configured to engage one of the plurality of links, one of the pair of carriage mounts mounted to one end of the one of the plurality of links and the other of the pair of carriage mounts mounted to the other end of the one of the plurality of links.

8. The system as set forth in claim 6, wherein the support rail includes a base, the base mounted to the carriage rail.

9. The system as set forth in claim 8, wherein the base includes a first elongated base member, and a stand disposed on one end of the first elongated base member, the stand extending generally orthogonal from the first elongated base member, the other end of the first elongated base member mounted to the carriage rail.

10. The system as set forth in claim 4, wherein the carriage includes a plurality of carriage arms, each of the plurality of carriage arms including a gripper adapted to engage a portion of the part so as to suspend the part above the carriage rail.

11. The system as set forth in claim 6, further including a sensor, the sensor operable to count a number of times one of the plurality of links has passed by the sensor.

12. The system as set forth in claim 11, further including a controller and an indicator, the controller operable to actuate the indicator when the sensor detects that one of the plurality of links has passed by the sensor a predetermined number of times.

\* \* \* \* \*